US005774262A

United States Patent [19]

Schwerdtner et al.

[11] Patent Number: 5,774,262
[45] Date of Patent: Jun. 30, 1998

[54] OPTICAL SYSTEM FOR THE TWO- AND THREE-DIMENSIONAL REPRESENTATION OF INFORMATION

[75] Inventors: Armin Schwerdtner; Holger Heidrich, both of Dresden, Germany

[73] Assignee: Technische Universitaet Dresden, Dresden, Germany

[21] Appl. No.: 530,134

[22] PCT Filed: Mar. 25, 1994

[86] PCT No.: PCT/DE94/00342

§ 371 Date: Jan. 22, 1996

§ 102(e) Date: Jan. 22, 1996

[87] PCT Pub. No.: WO94/23340

PCT Pub. Date: Oct. 13, 1994

[30]     Foreign Application Priority Data

Mar. 26, 1993 [DE] Germany .......................... 43 09 667.0

[51] Int. Cl.[6] .......................... G02B 27/24; G02B 27/22
[52] U.S. Cl. .......................................... 359/464; 359/462
[58] Field of Search ................................. 359/464, 463, 359/462; 348/54, 55, 59; 349/15

[56]                References Cited

U.S. PATENT DOCUMENTS

| 2,574,186 | 11/1951 | Mahler | 359/463 |
| 2,891,444 | 6/1959 | Ewald | 359/463 |
| 4,704,004 | 11/1987 | Nosker | 349/67 |
| 4,772,094 | 9/1988 | Sheiman | . |
| 5,036,385 | 7/1991 | Eichenlaub | . |

FOREIGN PATENT DOCUMENTS

| A-13076/92 | 10/1992 | Australia . |
| 2661259 | 10/1991 | France . |
| 4004739A1 | 8/1991 | Germany . |
| 4006868A1 | 9/1991 | Germany . |
| WO92/03021 | 2/1992 | WIPO . |

*Primary Examiner*—Jon W. Henry
*Attorney, Agent, or Firm*—Jordan and Hamburg

[57]                ABSTRACT

An optical system for the two- and three-dimensional representation of information by the use of transmission displays for the computer and video technology, for head-up displays for aviation and space flight, in advertising and presentation, in medical engineering, in the field of virtual reality and in other fields comprises: a light-source arrangement with at least one point or line source of light, a collimating optics for rendering the light parallel, a transmission display, a prism mask with prisms in a matrix arrangement, the prisms having two different prism angles, a field lens as a focussing optics as well as a phase mask. The image can be well seen by several viewers without any aid, the viewers being able to move laterally and vertically as they like. It is possible to offer two different TV programs to two or more persons at the same time. If all the viewers watch the same program, no sequential switching-over is necessary. An arrangement is possible such that the viewers see only the information intended for them (for example, cash dispensers, confidential information).

16 Claims, 6 Drawing Sheets

OPTICAL SYSTEM FOR THE TWO- AND THREE-DIMENSIONAL REPRESENTATION OF INFORMATION

BACKGROUND OF THE INVENTION

The present invention comprises an optical system for two- and three-dimensional representation of information by use of transmission displays for computer and video technology, for head-up displays for aviation and space flight, in advertising and presentation, in medical engineering, in the field of virtual reality and in other fields.

The two-dimensional representation of information by use of transmission displays with electronically selectable pixels in a matrix arrangement has been known for a long time, and it is used mainly in the computer and video technology and for games and displays, especially in portable computers, such as laptops or palmtops. A drawback of these systems is the high power required for operating the illumination, by which the battery life is reduced.

For the three-dimensional representation of information some solutions are known.

Most important are stereoscopic techniques. Usually, the two stereoscopic semi-images are assigned by additional aids. A well known technique uses mutually perpendicular polarized light representing the two semi-images, assignment to the viewer's eyes being effected by a pair of polarizing spectacles.

Another possibility is the sequiential display of the two semi-images, which are correctly assigned to the viewer's eyes through a pair of synchronously switching shutter spectacles.

Stereoscopic techniques have the great drawback that additional aids are required. These aids are not required for autostereoscopic techniques.

The best known autostereoscopic technique uses a lenticular screen which projects the light of the semi-images pixel by pixel onto the viewer's eyes. Unfavourable above all is the required fixed position of the viewer, whose lateral range of motion is restricted to one interocular distance. To increase this range, the number of pixels per screen lens has to be increased. There also occurs image flipping with the irksome reversal of the longitudinal magnification in the viewed image. Even greater demands on the resolution of the displays are made by solutions for several viewers.

Another autostereoscopic technique described in (U.S. Pat. No. 5,036,385) projects line or point sources of light through the pixels of a transmission display onto the eyes of the viewer. The correct assignment is obtained if the light sources are arranged in such a way that by the even-numbered and odd-numbered columns in the display they are visible only to the right and left eye, respectively. A drawback is the required fixed position of the viewer, the complicated illumination system and the high power for operating the illumination system. A switching-over device for the viewing of two-dimensional scenes is provided which uses what is known as the barrier technique. For the barrier technique a grid is placed in front of the display in such a way that, across the grid, the left eye sees only the columns corresponding to the left semi-image on the display. This applies analogously to the right eye and the corresponding image content.

A technique according to an Australian patent (AU-A-13076/92) constitutes a varied barrier technique. In the place of the grid, a screen with a geometrical arrangement of prisms is used. Prism-free columns of the screen are used as the gate for the right as well as the left semi-image. Just as with other barrier techniques, the rigid positioning requirements of display and viewer is a great drawback.

An autostereoscopic technique according to DE-OS 40 04 739, channels two semi-images or parts of the semi-images alternately onto the eyes of the viewer through one light source of a pair of light sources. This is achieved by optical elements with a lens function, the transmission display being in the range of the aperture diaphragms of the optical elements. Disadvantageously this time-sequential technique requires doubling of the image frequency, which with the present still very limited switching frequency of the transmission displays, makes great demands on realization, if the image is to be seen without flicker.

SUMMARY OF THE INVENTION

The task of the invention is to provide a high visibility two-dimensional or three-dimensional autostereographic image to one or more viewers by the use of a transmission display, the viewers being able to move laterally and vertically as they like and to see the image without any aid.

The present invention provides a transmission display which always contains both semi-images at the same time such that switching which, between the semi-images is not necessary.

The optical system for the two- and three-dimensional representation of information contains the following elements:

A light-source arrangement with at least one point or line source of light, a collimating optics for rendering the light parallel, a transmission display, a prism mask with prisms in a matrix arrangement, having two different prism angles, a field lens as focussing optics, as well as a phase mask.

The light is rendered parallel through the collimating optics, thus projecting the light of the left semi-image pixel by pixel onto the respective (left) prisms having a first prism angle and the light of the right semi-image onto the respective (right) prisms having another prism angle whereby, the two semi-images are spatially separated in respective directions. The focussing optics lead the two parallel bundles together to two points which correspond to the interocular distance. Therefore, the focussing optics acts as just one field lens covering the overall image.

The image composed of the semi-images can be seen only from these positions.

By lateral horizontal shifting of the light source or light-source arrangement the collimating optics generates other directions of parallel bundles, which after passing the transmission display and the prisms corresponding to the stereoscopic semi-images are split in other directions and led together by the focussing optics in other points. In this way, the viewer's position can be tracked by the stereoscopic semi-images. Analogously, by additional light sources or light-source arrangements, supplying the stereoscopic semi-images at additional places, displays to many viewers are possible. Each may move laterally while being tracked by the respective light sources.

For one viewer or a few viewers head motion and the tracking of the light-source arrangement new image contents which correspond to the respective position of the viewer or the viewers. Thus, it is possible to look behind the represented object, just as in holography.

The light emerging from the collimating optics and being rendered parallel for one or several viewers may be formed also by some or any number of point or line sources of light.

For example, for one viewer the illumination may be provided by an array of point sources of light, the light of which is collimated by a collimating optics in array shape in a direction given by the position of the light sources.

By the bunching of light the light efficiency is increased and the image can be seen in bright ambient light.

The phase elements assigned to each pixel with phase swings randomly distributed over the display act as a ground glass and ensure that the eyes no longer adapt to the brightest spot, the light source. This allows a reliable viewing of relatively homogeneous image fields, too.

The present invention thus provides a high image quality is achieved, for both the two-dimensional and three-dimensional (autostereoscopic) representation of information.

For the two-dimensional representation, the semi-images are taken from two-dimensional information, e.g. every second column for the left and right eye, respectively (at the known alternation of assignment after each scanning), and subsequently, as deviated onto both eyes and collimated, so that a highly visible two-dimensional image with the highest resolution given by the transmission display and great brightness is composed.

Compared with the usual viewing, the present invention provides a channelling of the light from the display to a small viewing angle. In this way, the greater part of the energy which otherwise is required for illumination can be saved. Moreover, viewing is possible only within this viewing angle. Here, above all, applications for laptops are realized.

With one and the same optical system used in television engineering it is possible to offer two different TV programmes to two or more persons at the same time. For that, the two image contents, containing two semi-images each, are synchronously activated sequentially with the light corresponding to the semi-images for the viewers. More than two TV programmes may be offered to several viewers at the same time. If all the viewers watch the same programme, no sequential switching-over will be required. The two semi-images are offered by activating the light.

Two or more viewers can see only the pictures which are contained in the projections to the viewer's eyes. This means, the images are not accessible to any other persons or any other viewing and the images for two or more viewers do not superimpose. This can be used advantageously. So, information may be put in and transmitted through a laptop, without other persons being able to look at that information. Interesting potential applications are cash dispensers, the banking industry, the transmission of confidential information from business and media.

DETAILED DESCRIPTION OF THE INVENTION

Figure 1:
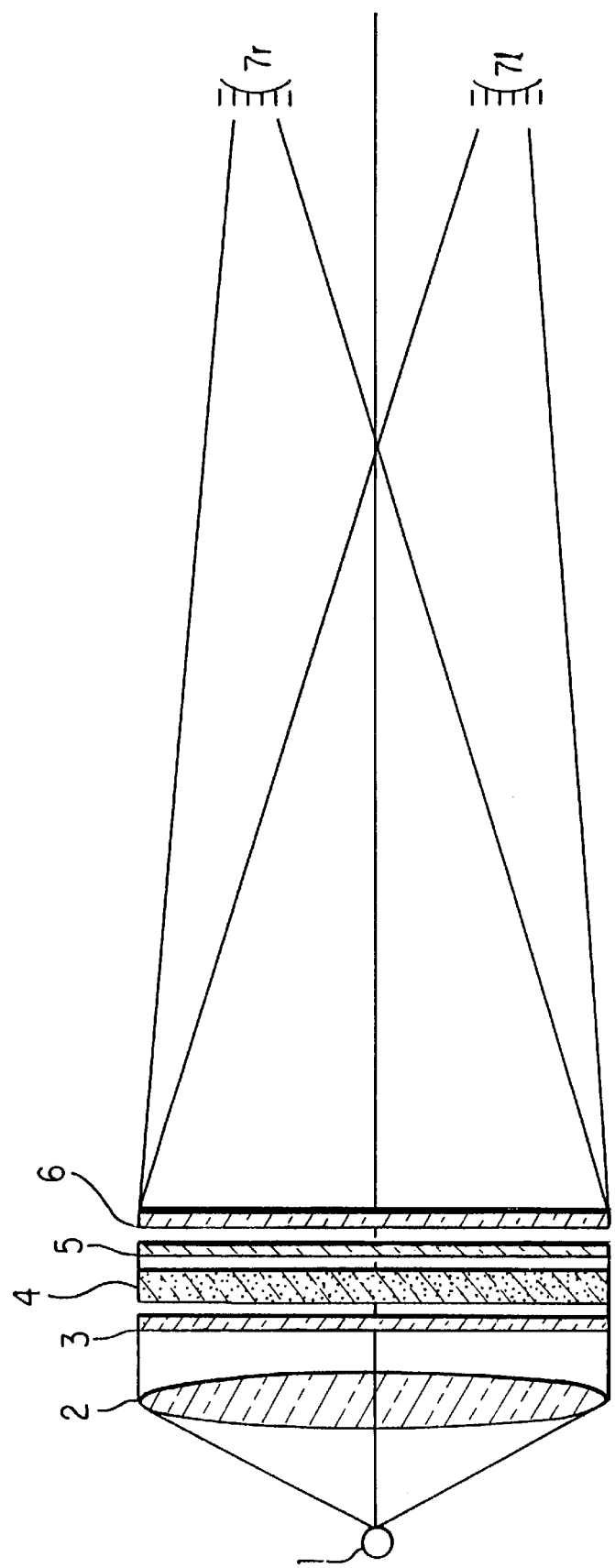
FIG. 1 shows an optical system for one viewer according to the present invention.

In FIG. 1 the optical system consists of a light source 1, a collimating optics 2, a phase mask 3, a transmission display 4, a prism mask 5 and a focussing optics 6. After collimation, the light of the light source 1 passes parallel through the phase mask 3 and the transmission display 4. Then it is split into two directions by the prism mask 5 and focussed onto the eyes 7r and 7l of the viewer.

Figure 2:
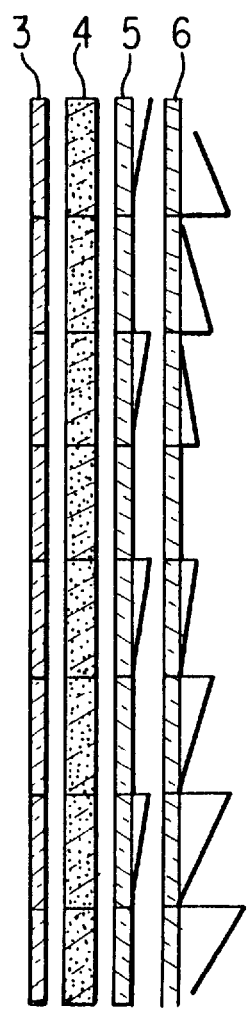
FIG. 2 shows a section of an arrangement of phase mask, transmission display, prism mask and focussing optics for one viewer according to the invention.

FIG. 2 shows a cross section consisting of the phase mask 3, transmission display 4, prism mask 5 and focussing optics 6 for one viewer. The prism mask 5 is composed of left and right prisms by which the light is directed onto the viewer's left and right eye, respectively. The prism angles of the right or left prisms are equal respectively over the whole matrix area, but different to each other. In the case of FIG. 2, one prism angle, e. g. that of the left prisms, is zero. The light passes through the left "prisms" without deflection and is focussed onto the left eye of the viewer by the following focussing optics. The real (right) prisms of the prism mask 5, however, deflect the parallel entering light. Together with the focussing optics 6 this light is focussed onto the other (the right) eye of the viewer.

In the transmission display, shown the right and left prisms are assigned four right and left pixels which contain the semi-image for the right and left eye, respectively.

If the semi-images are stereoscopic semi-images, the viewer will see a three-dimensional representation. If the semi-images are taken from a two-dimensional scene, the viewer will see a two-dimensional representation.

By the modulation of the light with randomly distributed optical phase deviations it is prevented that the viewer adapts to the light source.

The phase mask 3 and the prism mask 5 as well as the focussing optics 6 may be made as holographic optical elements and/or by means of embossing.

Figure 3:
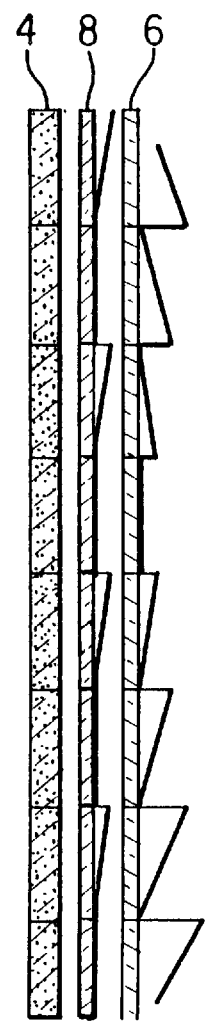
FIG. 3 shows an arrangement similar to that of FIG. 2 according to an embodiment the invention, wherein, however, the phase mask and the prism mask are grouped together into a combined mask.

FIG. 3 shows a combination of elements according to the invention, as represented in FIG. 2. From FIG. 2 the phase mask 3 and the prism mask 5 are advantageously combined to form a mask 8 in FIG. 3.

Figure 4:
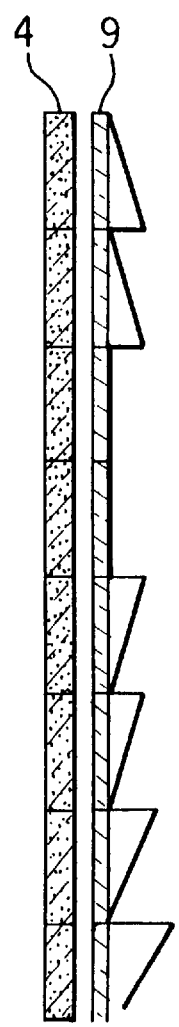
FIG. 4 shows an arrangement according to an embodiment of the invention similar to that of FIG. 2, wherein, however, the phase mask, the prism mask and the focussing optics are grouped together into a combined mask.

FIG. 4 shows, according to the invention, a higher degree of combination of the elements of the phase mask 3, prism mask 5 and focussing optics 6 represented in FIG. 2 to form a mask 9.

The masks 3, 5, 8, 9 or other masks produced by combination, the transmission display 4 and the focussing optics 6 may be combined, according to the invention, also in any other order and number. So, instead of as represented in FIG. 3, the transmission display may be arranged between the combined mask 8 and the focussing optics 6.

The masks 3, 5, 8, 9 or other masks produced by combination may, according to the invention, be mounted also directly on the surface of the transmission display.

Figure 5:
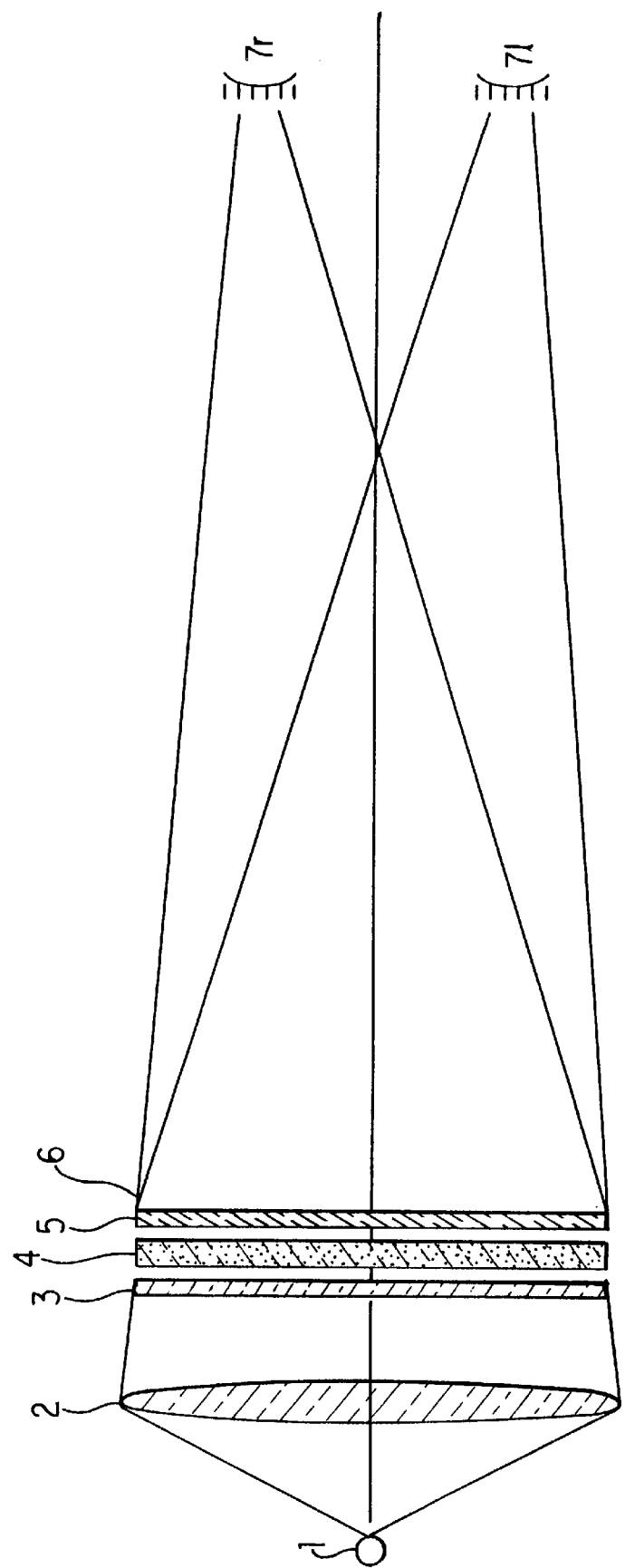
FIG. 5 shows an arrangement according to an embodiment of the invention, wherein the function of the focussing optics is taken over by the collimating optics.

Another advantageous embodiment of the invention provides for the function of the focussing optics in mask 6 or in any other combined masks, which comprise this function, being dropped and taken over by the collimating optics. FIG. 5 is an arrangement of this kind according to the invention.

Figure 6:
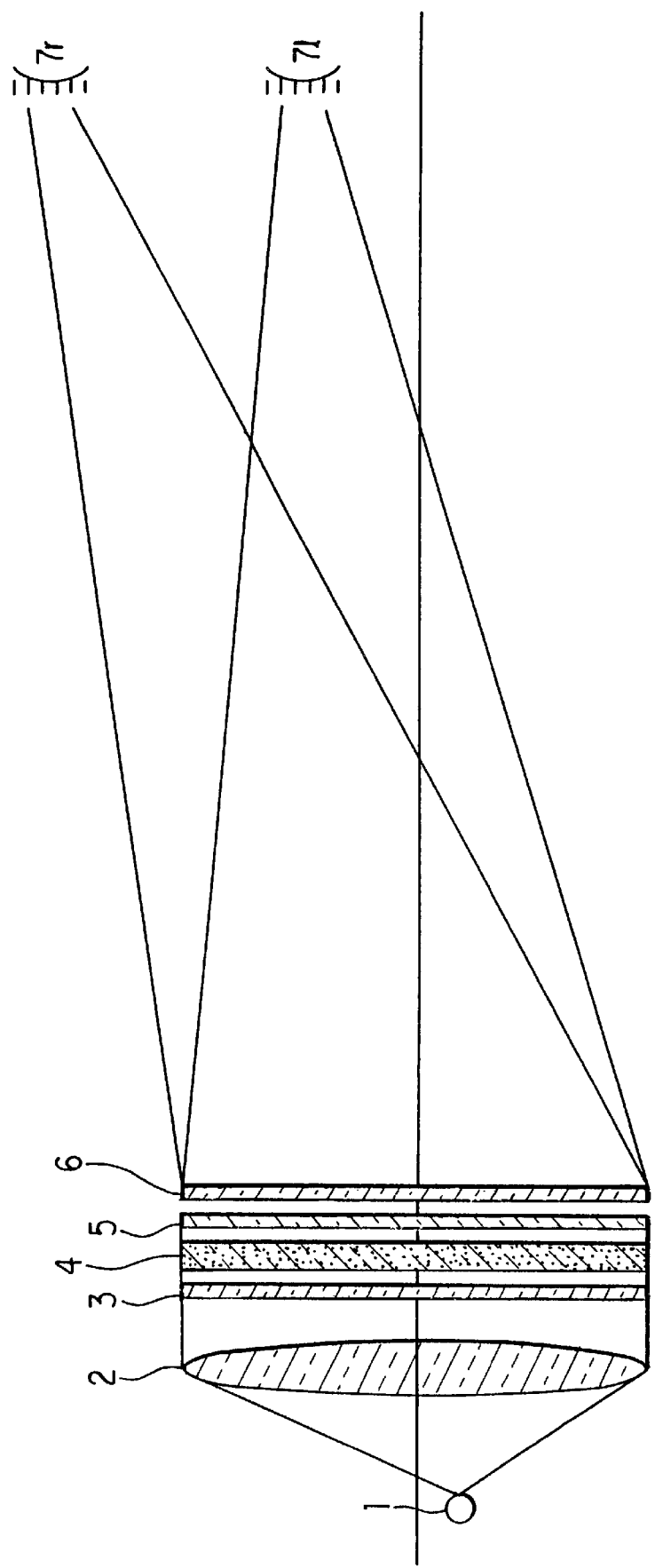
FIG. 6 shows an arrangement according to an embodiment of the invention for a moved viewer.

If the viewer changes his viewing position, the viewing direction may be tracked according to the invention. As to shown in FIG. 6, this may be achieved by changing the position of the light source by shifting it or by switching light sources 1 in different positions on.

Figure 7:
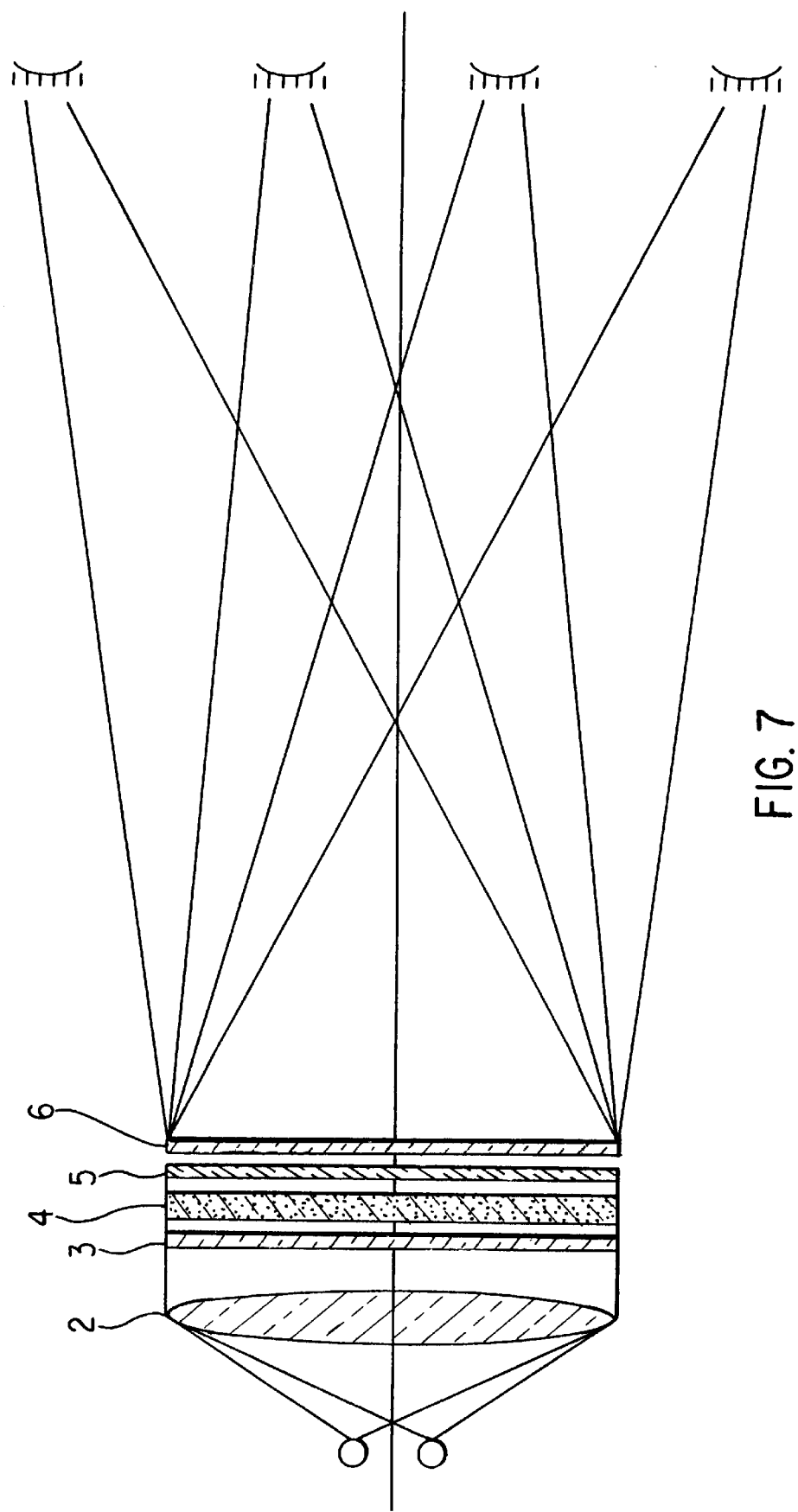
FIG. 7 shows an arrangement for two viewers according to an embodiment the invention.

FIG. 7 shows an optical arrangement with one point or line source of light for each viewer.

Figure 8:
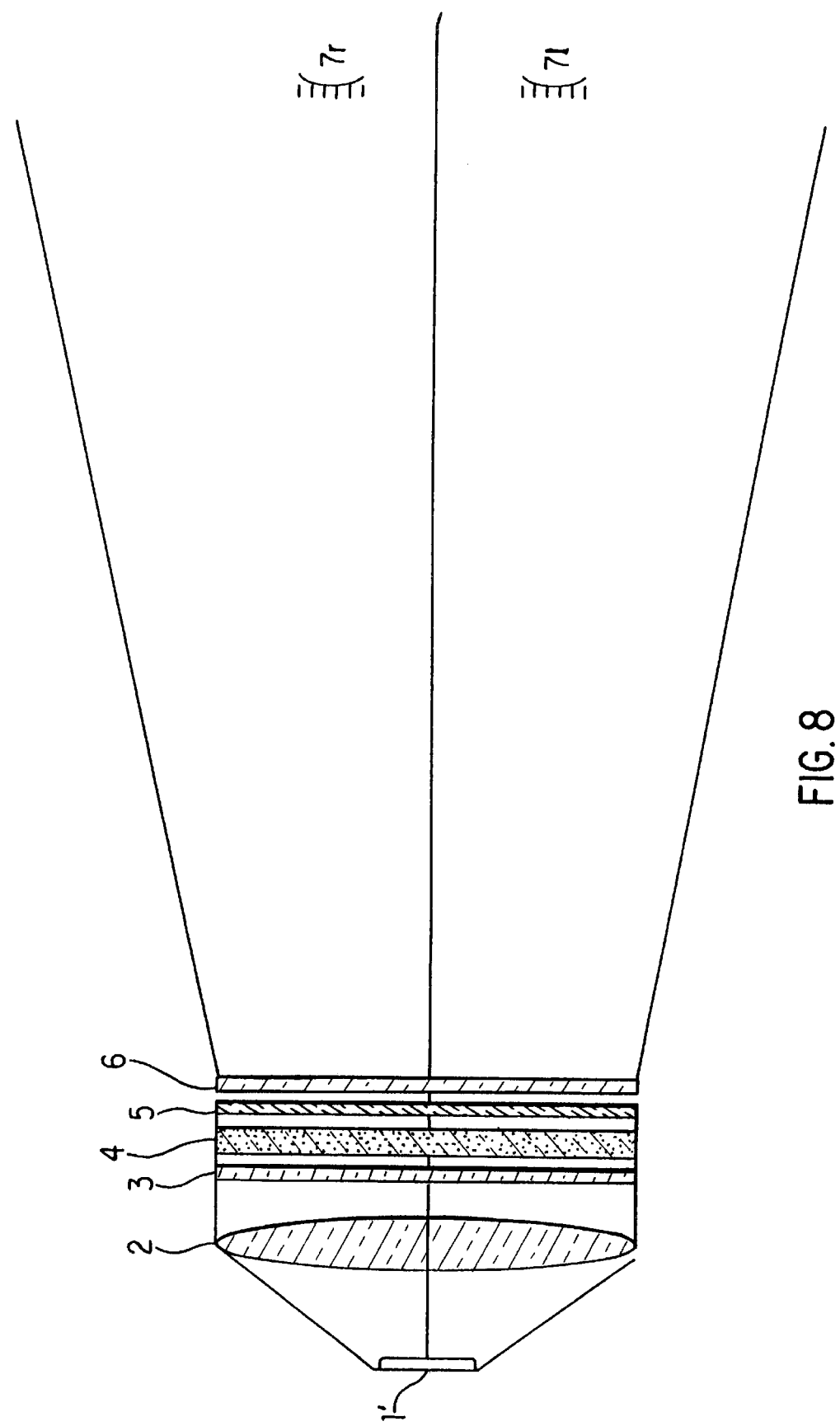
FIG. 8 shows an arrangement according to an embodiment the invention for the viewing of two-dimensional scenes with an increased viewing angle.

According to the invention, the optical system makes possible a two-dimensional representation with an increased viewing angle, as shown in FIG. 8. For this, a larger light source 1 is used or generates by switching other neighbouring light sources on.

We claim:

1. An optical system for the two- or three-dimensional representation of information, comprising:
    a transmission display having electronically selectable pixels in a matrix arrangement, wherein first and second sets of said selectable pixels respectively represent left and right stereoscopic semi-images simultaneously, and said transmission display having a light input side and a light output side;
    a light-source with at least one point or line source of light disposed facing the light input side of the transmission display;
    collimating optics interposed between said light source and said light input side of said transmission display for collimating light incident on said light input side;
    a prism mask disposed at said light output side of said transmission and containing first and second sets of prisms with first and second prism angles in a matrix arrangement and said first and second angles differing from each other, the first and second sets of prisms having a spatial arrangement on the prism mask respectively congruent with said first and second sets of selectable pixels of the transmission display, the first set of selectable pixels for the left stereoscopic semi-image being aligned with the first set prisms and the second set of selectable pixels for the right stereoscopic semi-image being aligned with the second set of prisms for receiving light transmitted trough corresponding ones of said first and second sets of pixels and directing the light to be received by a left eye and a right eye, respectively, of a viewer; and
    focussing optics for an entirety of the transmission display with a focal length corresponding to a viewing distance for focussing light emitted from the first set of prisms into the left eye and for focussing light emitted from the second set of prisms into the right eye of the viewer wherein light from the light-source passing through the collimating optics is substantially parallel passing through said transmission display and entering said prism mask.

2. An optical system as claimed in claim 1 further comprising a phase mask having a matrix of phase elements, each pixel being aligned with one of said phase elements and said phase elements having randomly distributed optical phase shifts.

3. An optical system as claimed in claim 1 wherein the prisms of the prism mask are arranged in one of columns and lines with the same prism angle per column or per line.

4. An optical stem as claimed in claim 1 wherein the focussing optics is designed as a mask acting as a field lens.

5. An optical system as claimed in claim 2, wherein said prism mask and said phase mask are formed as a combination mask.

6. An optical system as claimed in claim 2 wherein the phase elements are formed as holographic optical elements.

7. An optical system as claimed in claim 2 wherein the phase elements are produced by embossing.

8. An optical system as claimed in claim 1 further comprising a second light-source laterally displaced from said first light-source for providing focussed light to a second viewer laterally displaced from said first viewer.

9. An optical system as claimed in claim 8 further comprising means for sequentially driving said transmission display with alternating image data synchronously with driving a corresponding one of said first and second light-sources to deliver first and second images corresponding to said alternating image data to respective ones of the first and second viewers.

10. An optical system as claimed in claim 1 wherein a position of the light-source is shiftable parallel to the transmission display.

11. An optical system as claimed in claim 2 wherein said phase mask, said prism mask and said focussing optics are formed as a combination mask.

12. An optical system as claimed in claim 1 wherein said prism mask and said focussing optics are formed as a combination mask.

13. An optical system for the two- or three-dimensional representation of information, comprising:
    a transmission display having electronically selectable pixels in a matrix arrangement, wherein first and second sets of said selectable pixels respectively represent left and right stereoscopic semi-images simultaneously, and said transmission display having a light input side and a light output side;
    a light-source with at least one point or line source of light disposed facing the light input side of the transmission display;
    a prism mask disposed at said light output side of said transmission display and containing first and second sets of prisms with first and second prism angles in a matrix arrangement and said first and second angles differing from each other, the first and second sets of prisms having a spatial arrangement on the prism mask respectively congruent with said first and second sets of selectable pixels of the transmission display, the first set of selectable pixels for the left stereoscopic semi-image being aligned with the first set prisms and the second set of selectable pixels for the right stereoscopic semi-image being aligned with the second set of prisms for receiving light transmitted through corresponding ones of said first and second sets of pixels and directing the light to be received by a left eye and a right eye, respectively, of a viewer; and
    focussing optics interposed between said light-source and said transmission display with a focal length corresponding to a viewing distance for focussing light emitted from the first set of prisms into the left eye and for focussing light emitted from the second set of prisms into the right eye of the viewer.

14. An optical system as claimed in claim 1 wherein the prism mask is formed as holographic optical elements.

15. An optical system as claimed in claim 1 wherein said prism mask is produced by embossing.

16. An optical system as claimed in claim 4 wherein the mask of the focussing optics is produced by embossing.

* * * * *